I. COOPER.
Potato Digger.

No. 90,341. Patented May 25, 1869.

WITNESSES:
J. H. Burridge
Frank S. Alden

INVENTOR:
Ira Cooper.

United States Patent Office.

IRA COOPER, OF MIDDLEFIELD, OHIO.

Letters Patent No. 90,341, dated May 25, 1869.

---

IMPROVEMENT IN POTATO-DIGGER.

---

The Schedule referred to in these Letters Patent and making part of the same.

---

*To all whom it may concern:*

Be it known that I, IRA COOPER, of Middlefield, in the county of Geauga, and State of Ohio, have invented certain new and useful Improvements in Potato-Diggers; and I do hereby declare that the following is a full and complete description of the same, reference being had to the accompanying drawings, making a part of this specification, in which—

Figure 1:
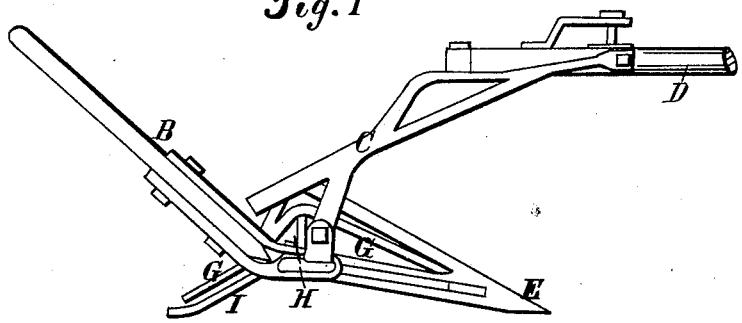

Figure 1 is a side view of the digger.

Figure 2:
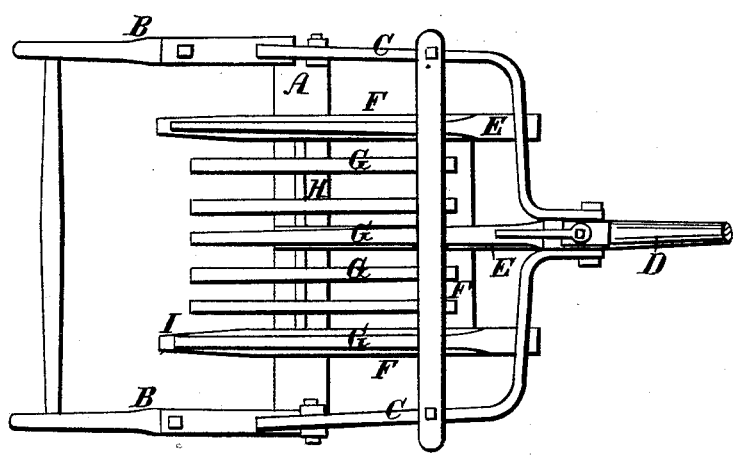

Figure 2, a view of the top.

Like letters of reference refer to like parts in the several views presented.

This invention has for its object the digging of potatoes by horse-power, the same being applied to an arrangement of spade-like points, which run into the ground under the hill, and lifting the same on to an inclined series of bars, which serve as a sieve whereby the dirt is sifted from the tubers.

In fig. 2, A represents a cross-bar, to which is attached, in a rigid manner, a pair of handles, B, whereby the machine is held and guided in the progress of its work.

To said bar is also connected, in a pivoted manner, by means of the arms C, a pole or tongue D, to which the team is hitched for drawing the implement.

E are three sharp, spade-like shares, attached rigidly to the cross-bar by means of the frame F.

G is a series of bars, the front end of which is secured to the front rail of the frame F, from which they recede backward and upward, forming an inclined plane, as shown in fig. 1, the elevation of the bars being sustained by the rail H, over which the bars hang downward near to the ground, as shown in fig. 1.

I is a pair of standards, whereby the extreme end of the bars and the cross-bar A are supported above the ground, and on which the weight of the machine is mainly borne.

The practical operation of this machine is as follows:

The implement is placed transversely across the row, or hills of potatoes, the operator holding and guiding it by the rail of the handles B. As the team advances, the spades are drawn into the ground under the hills, which are lifted thereby, and slide upward upon the inclined bars, between which the loose dirt falls under the machine, whereas the potatoes are carried back over the end, and fall upon the ground at the rear of the implement.

The machine can be made to run more or less deeply in the ground, at the will of the operator, by simply lifting upward or depressing the arms, thereby adapting it to the necessity of the work.

What I claim as my invention, and desire to secure by Letters Patent, is—

1. The spades, or shares E, as arranged in relation to and in combination with the inclined sieve, consisting of the bars G, substantially as and for the purpose set forth.

2. The standards I, pivoted frame C, arms B, and cross-bar A, when arranged and combined to operate in the manner described.

IRA COOPER.

Witnesses:
 FRANK J. SMITH,
 MOSES BOWER.